Patented Sept. 1, 1925.

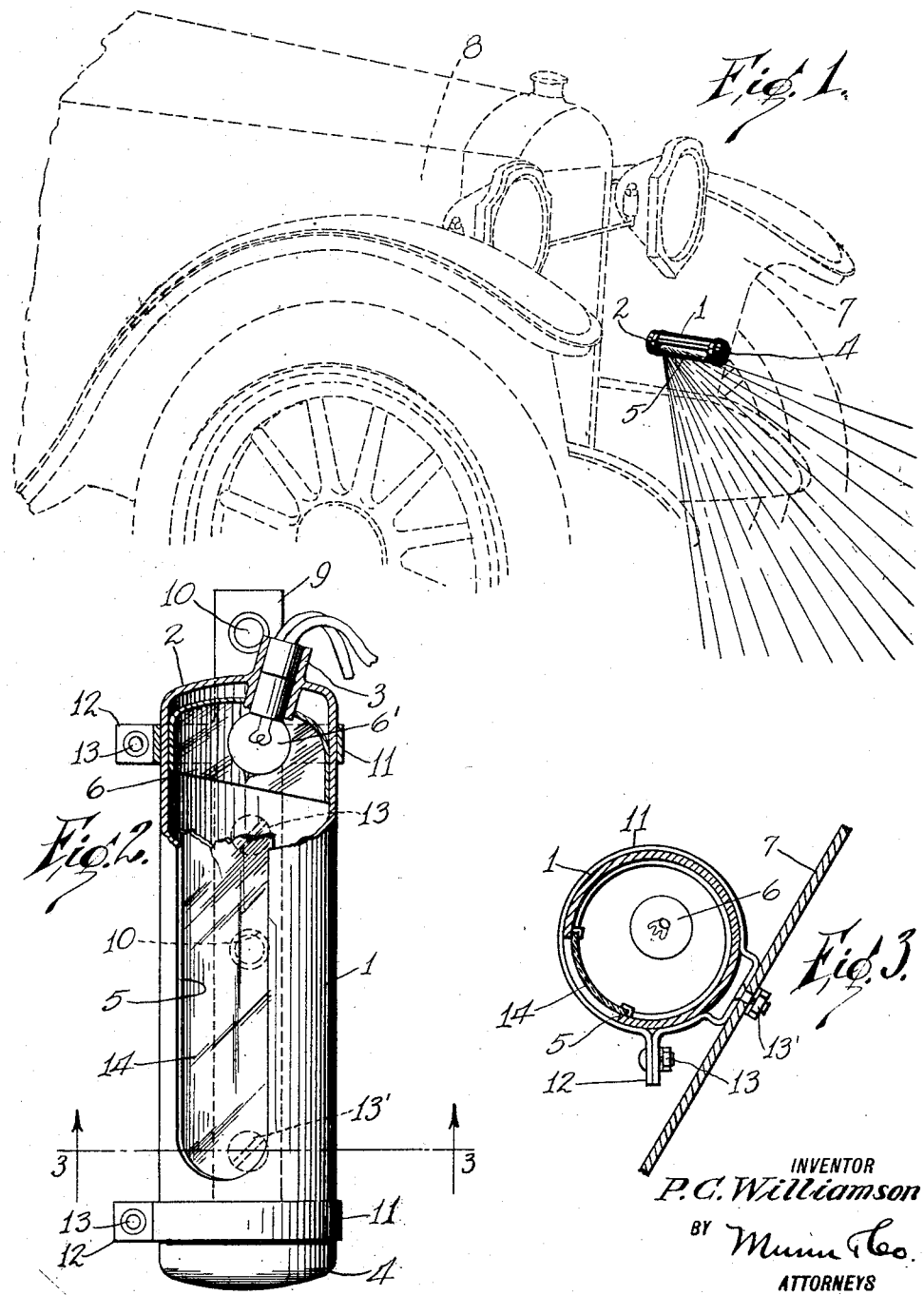

1,551,720

UNITED STATES PATENT OFFICE.

PERRY C. WILLIAMSON, OF CHICAGO, ILLINOIS.

ROAD LAMP.

Application filed October 11, 1923. Serial No. 668,017.

*To all whom it may concern:*

Be it known that I, PERRY C. WILLIAMSON, a citizen of the United States, and a resident of Chicago, in the county of Cook and State of Illinois, have invented a new and useful Improvement in Road Lamps, of which the following is a full, clear, and exact description.

My invention relates to improvements in lamps for illuminating the side of the road along which an automobile or motor vehicle is proceeding, and consists in the combinations, constructions and arrangements herein described and claimed.

An object of my invention is to provide a device which will illuminate the side of the road so that the driver can tell how far he is from the edge thereof, but which is so constructed that any glare from the lamp is absolutely prevented directly forward, i. e., in a direction in front of the vehicle.

A further object of my invention is to provide a simple road lamp which may be adjusted to throw the light at the proper angle so as to illuminate the edge of the road.

A further object of my invention is to provide a device which may be adjusted forwardly and backwardly so as to position the lamp at a point where intervening parts of the car will not cut off the rays from the side of the road where they are desired.

Other objects and advantages will appear in the following specification, and the novel features of the invention will be particularly pointed out in the appended claim.

My invention is illustrated in the accompanying drawings forming part of this application, in which—

Figure 1 is a perspective view showing the device applied to an automobile,

Figure 2 is a side view of the lamp, certain parts being shown in section, and

Figure 3 is a section along the line 3—3 of Figure 2.

In carrying out my invention I provide a substantially cylindrical casing 1 preferably of metal. The rear part of this casing is closed as shown at 2, but is provided with a lamp socket 3, this lamp socket being inclined downwardly and toward one side. The opposite end of the casing 4 is closed so as to prevent any light from shining directly in front of the vehicle. On one side, and preferably toward the bottom of the casing, is an opening 5. A reflector 6 is disposed toward the rear end of the casing and this reflector is so designed as to reflect the rays of the lamp 6' through the opening 5.

The lamp is preferably secured to the left-hand fender 7 of the automobile 8. To this end, a bracket 9 is provided having bolt openings 10. The bracket is provided with integral clamping arms 11 which pass around the casing 1 and which are bent outwardly at 12, bolts 13 being passed through the opposite end portions so as to clamp the casing securely. As will be seen from Figure 1, the arms 11 are bent upwardly from the body portion 9 of the bracket so as to space the casing 1 from the fender 7. The bolts 13' are passed through the fender and through the central portion 9 of the bracket, thus securing the lamp to the fender. In order to prevent dust or moisture from entering the lamp, I provide a glass section 14 for covering the slot or opening 5.

From the foregoing description of the various parts of the device, the operation thereof may be readily understood. The reflector 6 causes the rays of light to pass outwardly through the slot 5, thus causing the light to be thrown downwardly. The casing is elongated for the purpose of permitting some of the rays to be thrown along the side of the road in advance. The provision of the closed end 4, however, prevents any of these rays from striking the eye of the driver of an approaching vehicle, and therein differs from the ordinary spotlight, which is generally arranged so that the major portion of the light may be projected on the side of the road, while certain portions or rays escape and are reflected directly toward the front, even though the spotlight should be tipped at quite an angle.

The mounting of the road lamp permits it to be moved forwardly or rearwardly, and in such a case, another pair of holes 10 is used. This permits the lamp to be adjusted at times to a position which will throw the rays upon the side of the road, and avoid some part of the vehicle which might otherwise cut the rays off. The lamp may also be adjusted around its central axis by loosening the clamping bolts 13, and turning the casing to the desired point at which the rays will be cast on the side of the road desired. The bolts 13 may then be tightened so as to secure the lamp casing in its adjusted position.

It will be observed that it is essential that the end 4 be closed entirely so as to prevent the light from being cast directly ahead. Also, in order to give sufficient illumination, the casing must be elongated, that is to say, its major dimension is much greater than its diameter.

I claim:

A road lamp comprising an elongated cylindrical casing closed at its ends and formed with a slot therein extending longitudinally thereof, a reflector in one end of the casing, said reflector having a substantially cylindrical body portion and a head portion having a concavely curved inner surface, the head portion of the reflector being eccentric to the casing with its axis inclined toward the slot, the edge of the cylindrical portion of the reflector lying in a plane extending obliquely to the longitudinal axis of the casing, a light emitting element disposed within the reflector with the axis of said light emitting element inclined substantially toward said slot, a translucent closure for said slot, and means for supporting said casing on the fender of an automobile so that the casing will be substantially horizontal, with the end thereof provided with the reflector rearward and with the slot at the inner side of the casing near the bottom thereof.

PERRY C. WILLIAMSON.